(12) United States Patent
Rasmussen et al.

(10) Patent No.: US 6,529,616 B1
(45) Date of Patent: Mar. 4, 2003

(54) TECHNIQUE FOR ACCURATE COLOR-COLOR REGISTRATION MEASUREMENTS

(75) Inventors: D. Rene Rasmussen, Pittsford, NY (US); Edul N. Dalal, Webster, NY (US); Susan June Zoltner, Pittsford, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/450,181

(22) Filed: Nov. 29, 1999

(51) Int. Cl.$^7$ ................................................. G06K 9/00
(52) U.S. Cl. ....................... 382/112; 382/165; 382/287; 382/288; 382/289; 358/3.26; 358/504; 347/116
(58) Field of Search .......................... 382/112, 162–167, 382/287–289; 250/559.01, 559.49; 358/1.9, 3.26, 504, 406, 540; 347/19, 116

(56) References Cited

U.S. PATENT DOCUMENTS

| | | | |
|---|---|---|---|
| 4,071,911 A | | 1/1978 | Mazur |
| 4,086,434 A | | 4/1978 | Bocchi |
| 4,583,834 A | | 4/1986 | Seko et al. |
| 4,908,702 A | * | 3/1990 | Nagumo ..................... 348/263 |
| 5,038,319 A | | 8/1991 | Carter et al. |
| 5,057,866 A | | 10/1991 | Hill, Jr. et al. |
| 5,084,875 A | | 1/1992 | Weinberger et al. |
| 5,365,310 A | | 11/1994 | Jenkins et al. |
| 5,384,592 A | * | 1/1995 | Wong ......................... 347/116 |
| 5,510,876 A | | 4/1996 | Hayashi et al. |
| 5,510,885 A | * | 4/1996 | Mori et al. .................... 399/28 |
| 5,510,896 A | | 4/1996 | Wafler |
| 5,612,902 A | | 3/1997 | Stokes |

(List continued on next page.)

OTHER PUBLICATIONS

Remote Diagnostics Systems, Paul F. Morgan, Xerox Disclosure Journal, vol. 3, No. 3, May/Jun. 1978, pp. 191–192x.

Event–based architecture for real–time fault diagnosis, Real Time Fault Monitoring of Industrial Processes, A.D. Pouliezos & G.S. Staverakakis, Kluwer Academic Publishers, 1994, pp. 284–287.

Fault Diagnosis in Dynamic Systems Using Analytical and Knowledge–based Redundancy—A Survey and Some New Results, Paul M. Frank, Automatica, vol. 26, 90 International Federation of Automatic Control, 1990, pp. 459–474.

Combining Expert System and Analytical Redundancy Concpets for Fault–Tolerant Flight Control, David A. Handelman and Robert F. Stengel, Princeton University, J. Guidance, vol. 12, No. 1, Jan.–Feb. 1989, pp. 39–45.

*Primary Examiner*—Jon Chang
*Assistant Examiner*—Chong Kim
(74) *Attorney, Agent, or Firm*—Oliff & Berridge, PLC

(57) ABSTRACT

A special test pattern and image quality analysis system and process for evaluating the test pattern are provided to accurately measure color-color registration in an image output device that prints in CMYK color. The process is robust even when using relatively low-resolution CCD-based scanners and also is unique in that the process automatically factors out errors originating from skew between the detector and the subject of measurement. Further, registration of each of C, M, and Y relative to K are independently determined. The test pattern includes an upper part and a lower part, with both the upper and lower parts having a black K component and the upper part also including color components for C, M and Y. The system and method have potential for being built in to color printers or copiers to allow measurement of color misregistration within the paper path and automatically correct for color registration errors.

18 Claims, 8 Drawing Sheets

U.S. PATENT DOCUMENTS

| | | |
|---|---|---|
| 5,619,307 A | 4/1997 | Machino et al. |
| 5,642,202 A | 6/1997 | Williams et al. |
| 5,680,541 A | 10/1997 | Kurosu et al. |
| 5,694,528 A | 12/1997 | Hube |
| 5,748,221 A | 5/1998 | Castelli et al. |
| 5,884,118 A | 3/1999 | Mestha et al. |
| 5,909,235 A * | 6/1999 | Folkins ............... 347/116 |
| 6,023,525 A | 2/2000 | Cass |
| 6,198,490 B1 * | 3/2001 | Eom et al. ............ 347/116 |
| 6,219,517 B1 * | 4/2001 | Takahashi et al. ...... 347/116 |
| 6,404,517 B1 * | 6/2002 | Chao ................. 358/406 |

\* cited by examiner

TECHNIQUE FOR ACCURATE COLOR-COLOR REGISTRATION MEASUREMENTS

BACKGROUND OF THE INVENTION

1. Field of Invention

The invention relates to an image quality analysis system and method that can measure color-color registration to perform evaluation of printer and copier image quality automatically.

2. Description of Related Art

It is well known that customer satisfaction can be improved and maintenance costs reduced if problems with copiers and printers can be fixed before they become serious enough to warrant a service call by the customer. While current technology exists to enable printers and copiers to call for service automatically when sensors detect certain operating parameters outside of permissible ranges, there is not a very comprehensive manner of detecting incipient system failure or automatically diagnosing when problems with image quality reach a level where human observers perceive a reduction in quality. This is caused not only by the large number of operating parameters that would need to be tracked, but also because these parameters are strongly coupled to one another. That is, a given parameter at a certain value may or may not be a problem depending on the values of other parameters.

It is well known that color-color registration is critical for obtaining the optimal print quality from color printers and copiers. Currently used techniques for color-color measurements typically rely on absolute position measurements. Absolute position measurements require expensive, very high-accuracy equipment (e.g., motion stages). Such measurements are also easily affected by skew of the measured print relative to the measurement device.

As such, there are problems with existing color-color measurement systems.

SUMMARY OF THE INVENTION

There is a need for image output devices, such as printers and copiers, to better self-diagnose problems relating to image quality. Applicants have found that to comprehensively and reliably measure the system performance of a printer or copier, the image quality of the output must be measured.

One exemplary embodiment of the systems and methods of the invention overcomes such problems by developing powerful diagnosing tools within a digital printer or copier for self-diagnosis and evaluation of image quality. Image quality analysis can be performed to monitor many aspects of the printed output of the printing system. Of particular importance to overall image quality is color-color registration.

In this embodiment, the system provides: one or more digital test patterns stored in memory (or stored in hard copy form in the case of copiers) for providing one or more hard copy output test images; an input scanner that can scan the hard copy test image to form a digital raster image; and an image quality analysis module that receives information about the position of the digital raster image and produces test results relevant to determination of image quality, particularly color-color registration. The input scanner and image quality analysis module may form part of the image output device or may be stand-alone components used to test the device. Optionally, a communication module may be provided that is capable of contacting a service department or a more sophisticated diagnostic module if further analysis or service is necessary, depending on the outcome of the image quality analysis. Alternatively, information relating to color-color misregistration may be used by a corrective procedure within the image output device being tested to calibrate the device to correct for detected misregistration.

The systems and methods of the invention allow highly accurate measurements that are robust against skew At the same time the technique relies only on relative measurements, which can be performed sufficiently accurate with standard input scanners. The technique therefore also allows an alternative embodiment, where a special sensor (for example a small RGB CCD array) is placed in the paper path of the output device to detect color registration errors, and allow subsequent correction without the need to use a full-page scanner.

A special test pattern and measurement technique is used to allow highly accurate measurements of color-color registration in an image output device that prints in CMYK color (Cyan, Magenta, Yellow, Black). The method has been demonstrated to be accurate and robust using relatively low-resolution CCD-based scanners. The technique is unique in that it automatically factors out errors originating from skew between the detector and the subject of measurement Moreover, this invention determines the registration of each of C, M, and Y relative to K such that each of the C-K, M-K, and Y-K measurements are independent, and can obtain higher accuracy by averaging results over two or more lines.

In the case of C-K measurements, two reflectance profiles, using the red channel of the scanner, are taken across upper and lower parts of the image. From these profiles the centroids of the K and C lines are calculated. The offset between the centroid of upper(C) line #3 and lower(K) line #3 is a measure of the C-K misregistration, but also includes a contribution due to skew of the image. The offset between the centroid of upper(K) line #1 and lower(K) line#1 is a measure of the skew. By subtracting the two offsets, a skew-independent measure of the C-K misregistration is obtained. The M-K and Y-K registration errors are determined in similar fashion, using green and blue scanner channels respectively.

The system and methods of the invention have potential for being built in to color printers to allow measurement and automatic correction of color registration within the image path.

BRIEF DESCRIPTION OF THE DRAWINGS

The invention will be described with reference to the following illustrative drawings, wherein like numerals refer to like elements and wherein.

DETAILED DESCRIPTION OF PREFERRED EMBODIMENTS

Figure 1:
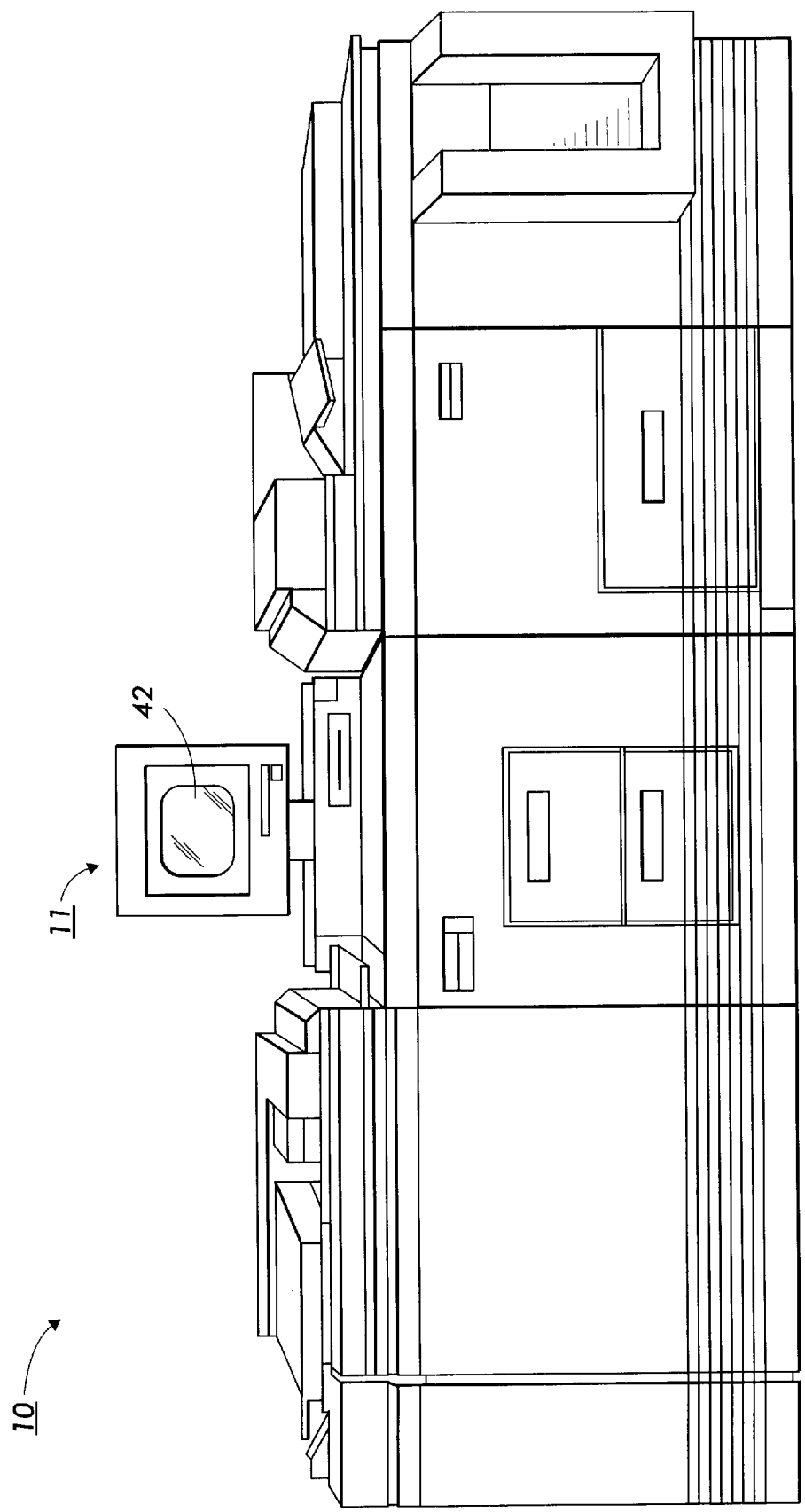
FIG. 1 shows a typical digital copier machine having a user interface suitable for use with the invention.

An exemplary device to which automatic image quality analysis is to be performed will be described with reference to FIGS. 1–3. FIG. 1 shows an image output device, in particular a digital copier machine 10, comprising a plurality of programmable components and subsystems which cooperate to carry out copying or printing jobs programmed through a touch dialog screen 42 of a user interface (UI) 11. Internal operating systems of the digital copier 10 are disclosed in U.S. Pat. Nos. 5,038,319, 5,057,866, and 5,365,310, owned by the assignee of the present invention, the disclosures of which are incorporated herein by reference in their entirety. As such, no further detailed description thereof is necessary. Digital copier 10, however, is merely representative of a preferred printing system to which the image quality determination is made. It should be understood that a loosely coupled printing or reproducing system is also applicable for use with the invention described herein, such as a printer or facsimile device. Moreover, while there may be benefits to use of the image quality analysis on a reproduction system, such as a digital copier having an integral scanner component, the invention also is applicable to a printer used in conjunction with a stand-alone scanner, such as a flatbed type scanner.

Figure 2:
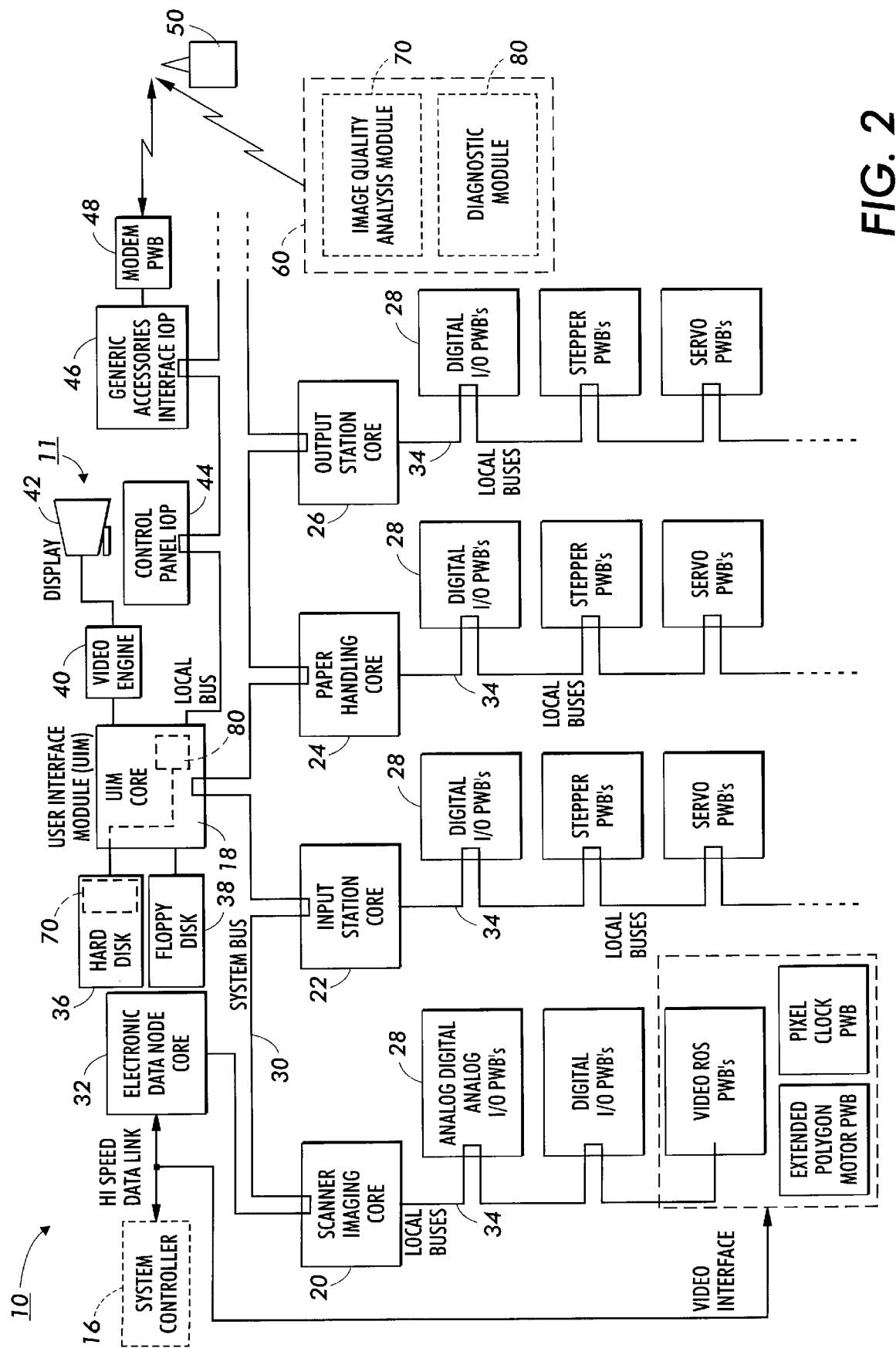
FIG. 2 is a schematic diagram of a digital copier having a user interface for communicating with a remote diagnostic computer.

Referring to FIG. 2, operation of the various components of exemplary digital copier 10 is regulated by a control system which uses operating software stored in memory in the system controller 16 to operate the various machine components in an integrated fashion to produce copies and prints. The control system includes a plurality of printed wiring boards (PWBs), there being a user interface module (UIM) core PWB 18, a scanner/imaging core PWB 20, an input station core PWB 22, a paper handling core PWB 24 and an output station core PWB 26, together with various input/output (I/O) PWBs 28. A shared line (SL) 30 couples the core PWBs 18, 20, 22, 24 and 26 with each other and with the electronic data node core 32, while local buses 34 serve to couple the PWBs to the respective cores and to stepper and servo PWBs. Programming and operating control over digital copier 10 is accomplished through touch dialog screen 42 of UI 11. The operating software includes application software for implementing and coordinating operation of system components.

Floppy disk port 38 provides program loading access to UIM core PWB 18 for the purpose of entering changes to the operating software, loading specific programs, such as diagnostic programs, and retrieving stored data, such as machine history data and fault data, using floppy disks. Hard disk 36 is used as a non-volatile memory (NVM) to store programs, machine physical data and specific machine identity information. One of the programs hard disk 36 may store is image quality analysis software that forms an image quality analysis module 70 used by the invention. Module 70 may also reside on a floppy disk used in floppy disk port 38.

UIM core PWB 18 communicates with video engine 40 for driving a suitable visual display 42, such as a CRT or flat screen of the user interface 11. The UIM core 18 also has connected thereto a control panel I/O processor 44 and a generic accessories interface I/O processor 46. The interface I/O processor 46 is in turn connected to a modem PWB 48. The modem 48 provides communication between digital copier 10 and a communications channel, such as a public switched telephone network 50 to facilitate information transfer to and from a remote diagnostic computer 60, which may also include image quality analysis module 70 as well as other diagnostic modules.

The information from the subsystem cores flows to and from the UIM core PWB 18, which embodies software control systems including a user interface system manager and a user interface manager. The UI system manager includes a UI display manager subsystem for controlling the display of messages on the display 42. A data manager subsystem provides data management to the UI system manager.

Figure 3:
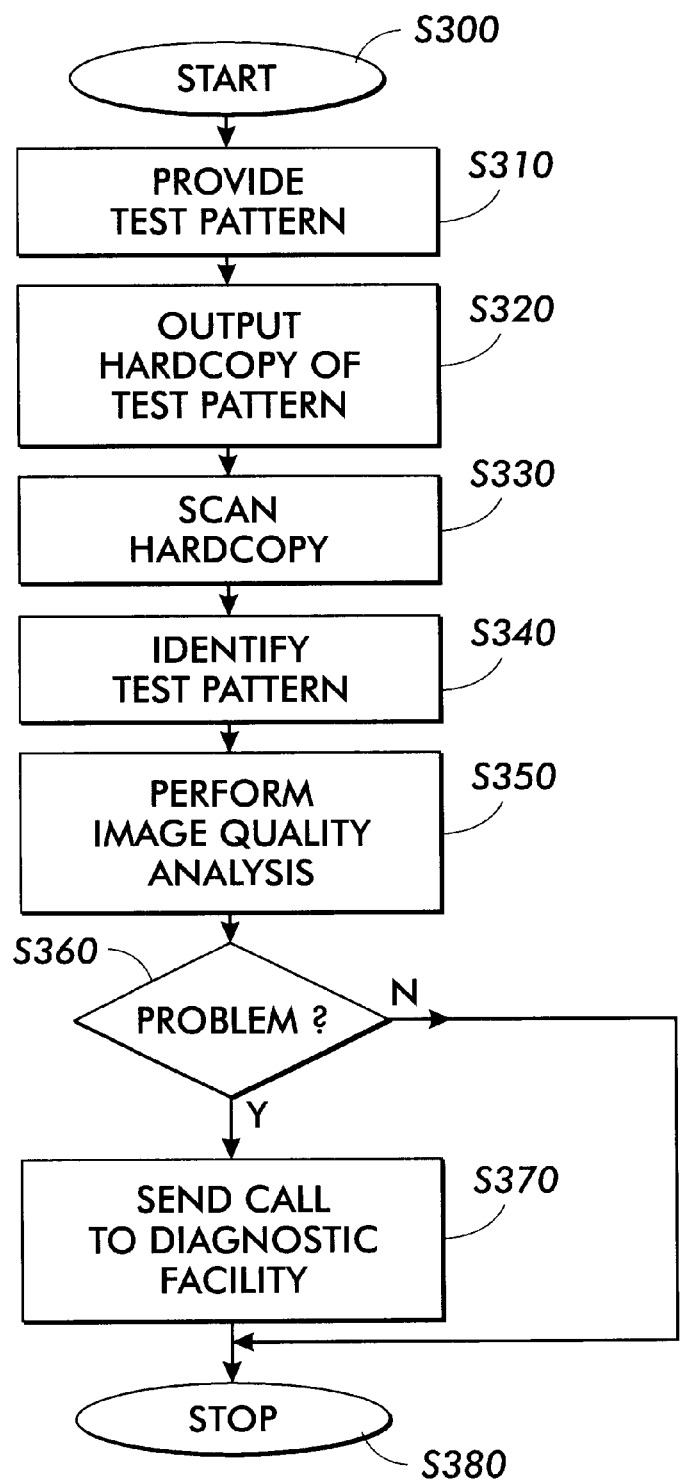
FIG. 3 is a flow chart showing an image analysis method according to the invention.
Figure 4A:
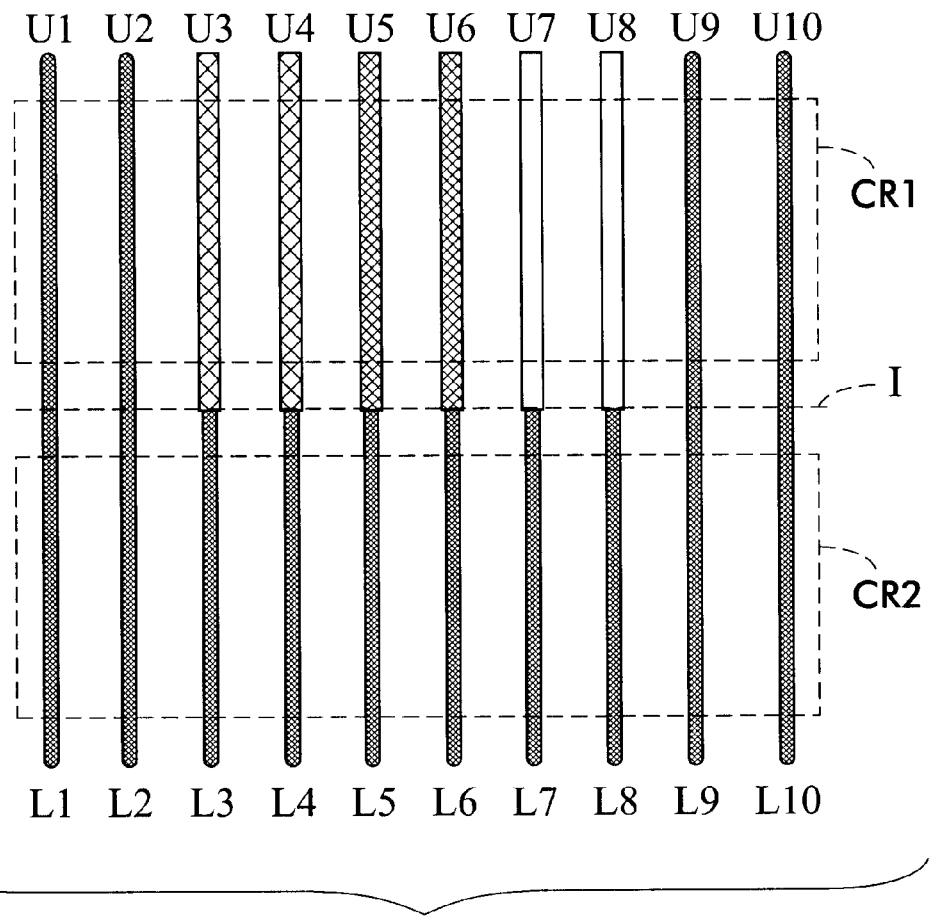
FIG. 4A is an exemplary digital test target used by the invention showing in dashed lines the virtual separation between upper and lower lines and zones within the upper and lower lines that are actually used for analysis purposes (the dimensions of this test target are on the order of 10 by 10 $mm^2$.

In a first embodiment of the invention, image quality analysis is performed by the process set forth in the flow chart of FIG. 3. The process starts at step S300 and advances to step S310 where at least one specific digital test pattern, which can either be in hardcopy original form or a digital image stored in memory 36, is provided. An exemplary test pattern is illustrated in FIG. 4 and will be described in more detail later. Preferably, multiple different test patterns are used to analyze various components relevant to a determination of image quality. Flow then proceeds to step S320 where a corresponding hardcopy output of the test pattern is generated. This can be by outputting a printed hardcopy output from output station 26 using the digital test pattern as an input when the test pattern is stored in digital form, such as in hard disk 36 or floppy disk 38. Alternatively, an accurate original hardcopy test pattern may be placed at scanner 20 and scanned into the digital copier 10 to form a digital test pattern, which can be used as an input to output station 26 to form the hardcopy output. Then, flow advances to step S330 where the hardcopy output is scanned by scanner 20 to form a digital raster image for analysis purposes.

After step S330, flow advances to step S340 where the digital image is preferably acted on by pattern recognition software, which can be located within hard disk 36 or floppy disk 38 and is associated with image quality analysis module 70, to determine a precise location of various test elements within the scanned digital raster image. This software uses a Hough or similar transform to automatically detect locator marks on the image. A suitable pattern recognition system for use with the invention can be found in U.S. Pat. No. 5,642,202 to Williams et al., owned by the assignee of the present invention, the disclosure of which is incorporated herein by reference in its entirety. Alternatively, or in conjunction therewith, the test pattern may include a script that signifies a particular test pattern. The image quality analysis module 70 may use hardware/software to decipher the particular script embedded into the test pattern. The memory of the image quality analysis module 70 may be provided with a file corresponding to each possible script detailing the contents of the script and associated test pattern, as well as detailing the particular image quality analysis routine to be used to measure a particular part of overall image quality. A more detailed description of such a scripted test pattern can be found in co-pending U.S. Ser. No. 09/450,182 to Rasmussen et al., filed concurrently herewith, entitled "Method to Allow Automated Image Quality Analysis of Arbitrary Test Patterns", the subject matter of which is incorporated by reference herein in its entirety.

After step S340, the process flows to step S350 where image quality analysis is performed on the test image using image quality analysis module 70. From step S350, flow advances to step S360 where a determination is made by the image quality analysis module 70 whether the image quality for this particular test image is acceptable. If it is, flow advances to step S380 where the process stops. However, if the image quality is not acceptable, flow advances from step S360 to step S370 where a call can be made to a diagnostic facility. This call may be an automatic service call made through modem 48 for scheduling an actual service visit by a service technician to correct the noted problems. Alternatively, it may be a call to a more sophisticated diagnostic module 80 located locally or at the remote facility that can further analyze the image quality problem along with values from various sensors and settings on the copier 10. This would provide corrective feedback to the digital copier 10, such as through modem 48 when module 80 is remotely located, allowing the digital copier 20 to adjust itself within acceptable parameters.

Figure 8:
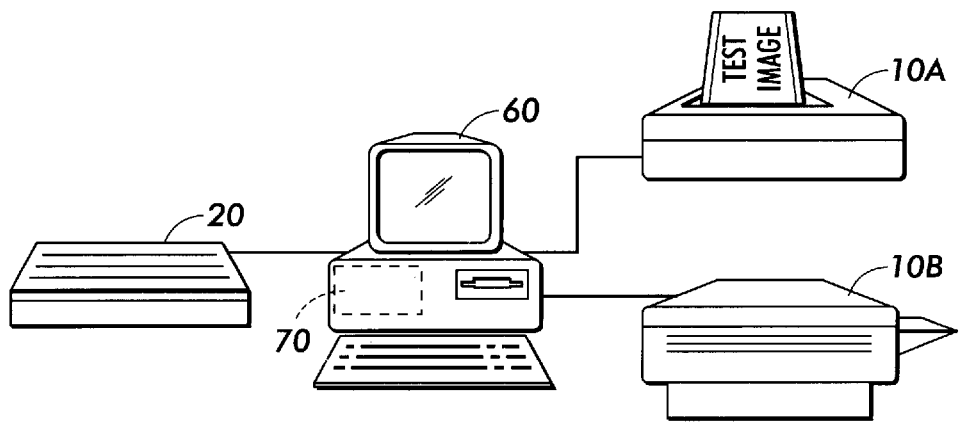
FIG. 8 is an alternative image output device and image analysis system according to the invention.

Alternatively, the image quality analysis module 70 may be remote from image output device 10. An example of which is illustrated in FIG. 8 where image output devices are in the form of printers 10A, 10B which are associated with a personal computer 60 through appropriate data cables. A flat bed scanner 20 is also associated with personal computer 60 and image quality analysis module 70 is in the form of software provided in personal computer 60. This embodiment operates as the previous embodiment in that the printers 10A, 10B (which ever is being tested) are given a test pattern to generate a hardcopy output from. This hardcopy output is then placed in scanner 20 to generate the digital test image. This digital test pattern is then analyzed to determine image quality of the printer.

While shown in FIG. 8 to be loosely associated, the invention can also be practiced with completely discrete components, such as a separate printer, scanner and computer or other source for containing image quality analysis module 70. In this case, the hardcopy output from the printer can be provided to a non-associated scanner for scanning. Then, the digital test image from the scanner can be stored or converted onto a portable recording medium, such as a floppy disk and provided to a non-associated computer having the image quality analysis module.

The test pattern used can be one of several test patterns designed to provide evaluation of a particular parameter relevant to image quality analysis of the output of the printing system, such as color registration, motion quality, micro and macro uniformity, color correction, and font quality.

This particular invention relates specifically to determination of color-color registration, which forms a part of the overall image quality analysis. For a more detailed description of the overall image quality analysis system, see co-pending U.S. Ser. No. 09/450,185 to Rasmussen et al., filed concurrently herewith, entitled "Virtual Tech Rep By Remote Image Quality Analysis", the disclosure of which is incorporated herein by reference in its entirety.

Another exemplary test pattern and analysis suitable for determining pixel placement accuracy to a high precision can be found in co-pending U.S. Ser. No. 09/450,184 to Dalal et al., filed concurrently herewith, entitled "Quantification of Motion Quality Effect on Image Quality", the subject matter of which is incorporated by reference herein in its entirety. Furthermore, a test pattern and analysis may be used to distinguish and categorize various non-uniformities. Such an exemplary analysis can be found in co-pending U.S. Ser. No. 09/450,180 to Rasmussen et al., filed concurrently herewith, entitled "Image Processing Method for Characterization of Uniformity of Printed Images", the subject matter of which is incorporated by reference herein in its entirety. Other test patterns can be used to determine quality of font reproduction. An example of such can be found in co-pending U.S. Ser. No. 09/450,177 to Rasmussen et al., filed concurrently herewith, entitled "Outline Font For Analytical Assessment of Printed Text Quality", the subject matter of which is incorporated by reference herein in its entirety.

The image quality analysis according to this invention is preferably performed with as much automation as possible to reduce the amount of human involvement with the process. In the case of a digital copier or reprographic machine, such as machine 10 having both an output station and a scanner station, analysis can be initiated automatically by the image quality analysis module 70, which can be stored within hard disk 36, for example. That is, the image quality analysis module 70 may operate as a self-executing program either initialized at start-up or after a predetermined period of use or number of copies made, such that module 70 causes the test pattern to be printed by output section 26 and then causes the hardcopy output therefrom scanned by scanner section 20. This can be achieved in an automated fashion, for example, by having the print output of the station 26 linked to the scanner station 20 input, as in U.S. Pat. No. 5,884,118 to Mestha et al., owned by the assignee of the present invention, the disclosure of which is incorporated herein by reference in its entirety.

Figure 4B:
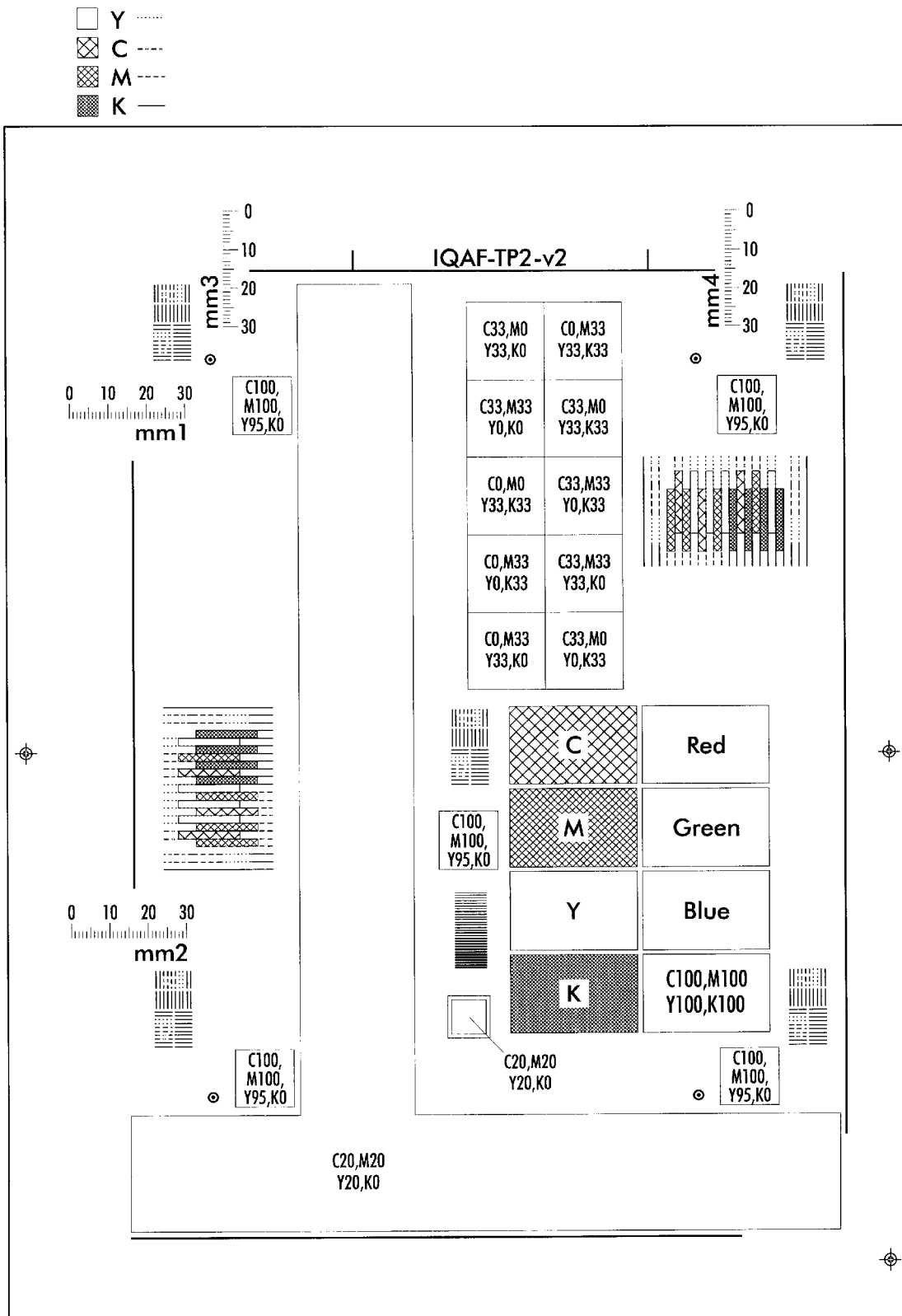
FIG. 4B is an exemplary full-page digital test pattern, incorporating the test target in FIG. 4A, five times in horizontal orientation and five times in vertical orientation, as well as containing different test targets which can be used for measurements of other image quality attributes.
Figure 5:
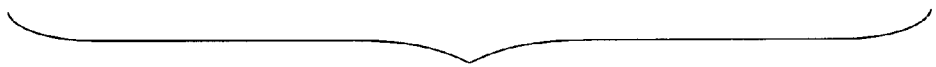
FIG. 5 is an exemplary output from the digital copier based on the digital test pattern of FIG. 4A, showing both skew and mis-registration, and also showing in dashed lines the virtual separation between upper and lower lines and zones within the upper and lower lines that are actually used for analysis purposes.

An exemplary full-page test pattern useful to determine color-color registration as well as other image quality metrics, in a color image output device is illustrated in FIG. 4B. The specific region of the full-page test pattern that is used for color registration measurements is shown in enlargement in FIG. 4. This particular test pattern is useful in a device that outputs using a CMYK color space, with C being Cyan, Y being Yellow, M being Magenta and K being Black. Similar to that disclosed in co-pending U.S. Ser. No. 09/450,182, this test pattern (FIG. 4B) can be provided with a script to identify the particular test, as well as identify the analysis procedure to be implemented to analyze the test pattern. In this example, the full-page test pattern is provided with a human-readable script name (IQAF-TP2-v2) which could also be represented as bar code or other machine-readable form. Suitable bar code readers or optical character recognition equipment can be used to decipher the script, which will be recreated when the input pattern is output as a hardcopy by the image output device 10. The script is preferably provided to specify the location of subregions of interest from the various sub-regions provided on the test pattern, as well as indicating what type of analysis is to be performed on that particular sub-region.

The test pattern has 10 upper line positions (labeled U1 through U10) and 10 lower line positions (labeled L1 through L10), which merge at the imaginary dashed line I, which does not form part of the test pattern but is provided for illustrative purposes. The 10 lines in the lower part (L1–L10) are black (K) only. The upper part has lines in each of K, C, M and Y. In particular, U1 and U2 are black, U3 and U4 are cyan, U5 and U6 are magenta, U7 and U8 are yellow, and U9 and U10 are also black.

A method of using the test pattern to determine color-color registration will now be described with reference to FIG. 6.

The process starts at step S600 and advances to step S610 where the digital test pattern of FIG. 4 is used as an input to obtain a hardcopy output from an image output device to be tested, which for example can be copier 10 in FIG. 2. Then, at step S620, the hardcopy output is placed into a suitable image capture device, such as a scanner or CCD device 20, and scanned to provide a digital image corresponding to the hardcopy output. A particularly suitable image capture device is a flatbed scanner, which may be a stand-alone scanner (as in FIG. 8) when testing is being performed on a printer or other image output device with or without an integral scanner, or could be the integral scanner (as in FIG. 2) of the image output device in the case of a copier. Thus, for example, the scanner section 20 of copier 10 may be used to scan the hardcopy output to obtain the digital image. Best results are obtained with a color scanner, for example an RGB scanner, but in principle a monochrome scanner could be used, provided it gave sufficiently high contrast and signal-to-noise ratio for cyan, magenta, and yellow lines.

Once the digital test image is obtained from step S620, flow advances to step S630 where image quality analysis module 70 selects a Red channel (the channel complementary to the color of the lines being analyzed) of the image for processing. Flow then advances to step S640 where a horizontal intensity profile is obtained from the digital test image. In particular, this intensity profile is an upper red intensity profile determined from the upper lines U1–U10. However, to avoid erroneous results, the entirety of lines U1–U10 and L1–L10 are not analyzed. Instead, only the central region CR1 shown in dashed outline in FIG. 4 is used (similarly, when the lower intensity profile is subsequently determined, only the central region CR2 is used). This prevents extraneous information or artifacts found at the extremities of the lines, particularly at the merge area of the upper and lower lines, from affecting the analysis.

In particular, step S640 involves averaging the pixel values of the image over the vertical direction within the central region CR1 for each horizontal pixel position. The profile is an array of intensities, with one intensity for each horizontal pixel position corresponding to the average intensity in the vertical direction. This horizontal intensity profile is referred to as the upper red profile.

From Step S640, flow advances to step S645 where a background intensity (BI) is determined from a maximum value of the lower red profile (the area bounded by the dashed box CR2). After step S645, flow advances to Step S650 where centroid positions of lines U1, U2, U3, U4, U9 and U10 are determined from the upper red profile. This can be achieved rather easily as both the black and cyan lines provide high contrast when viewed through the red channel, and as the approximate line locations are known from the digital test pattern.

Figure 7:
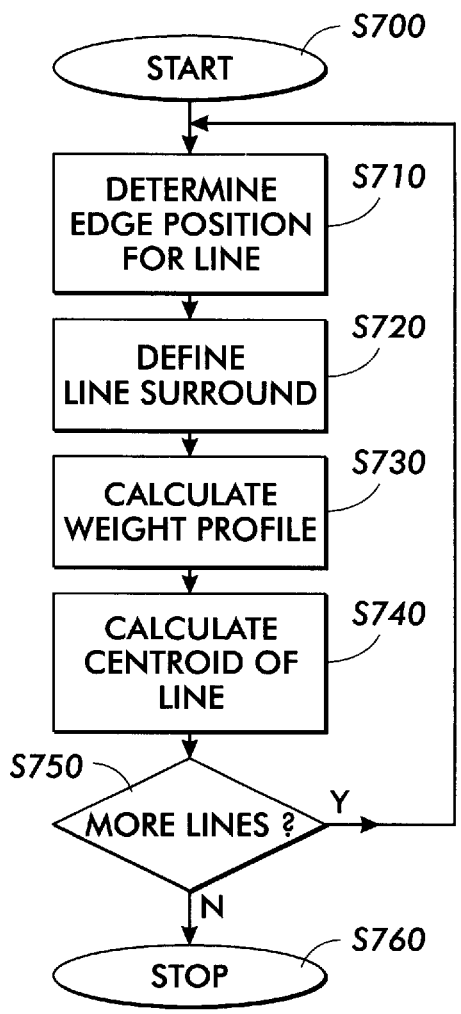
FIG. 7 is a detailed flow chart showing an exemplary centroid determination process according to the process of FIG. 6.

In particular, step S650 can be broken up into the following subroutine described with reference to FIG. 7. The process starts at step S700 and advances to step S710 where edge positions of a first line are determined (U1). This can be achieved in several ways. One exemplary way is to first determine approximate edge positions. Then, the average intensity of the line (U1) within those approximate edge locations is determined. Then, exact edge locations are set as the points corresponding to intensity levels midway between the background intensity and the average line intensity.

From step S710, flow advances to step S720 where the line surround is defined. In a first iteration, we are working with line U1. This surround is defined such that it is certain to contain not only the region defined by the line edges of U1 (from step S710), but sufficient white surround around this region as well. In practice, this is usually satisfied when about 200 microns are included that extend outside of the line edges. Alternatively, the surround can be set by 10%–90% line edge widths of the U1 line as calculated by the lower red profile, with the line surround for U1 being set to extend three times the edge width beyond the edge locations. This line surround is used later to calculate the centroid location. It is important in this calculation that the region covers image area outside of the actual edge of the line.

From step S720, flow advances to step S730 where a weight profile is calculated from the lower red profile by assigning each pixel location X a weight W(X) that is equal to the following equation:

$$W(X)=IB-R(X),$$

where R(X) is the lower red profile at pixel location X and IB is the background intensity.

Then, the process advances to step S740 where the centroid position of the particular line (U1 in the first iteration) is calculated as the centroid of the weight profile over the line surround (U1-surround).

Then, at step S750, the process proceeds to S760 and stops if no further lines need calculations. Otherwise, flow returns to step S710 to complete calculations for remaining ones of lines U1, U2, U3, U4, U9 and U10. At the end of the process shown in FIG. 7, centroids XU1, XU2, XU3, XU4, XU9 and XU10 are determined.

Figure 6:
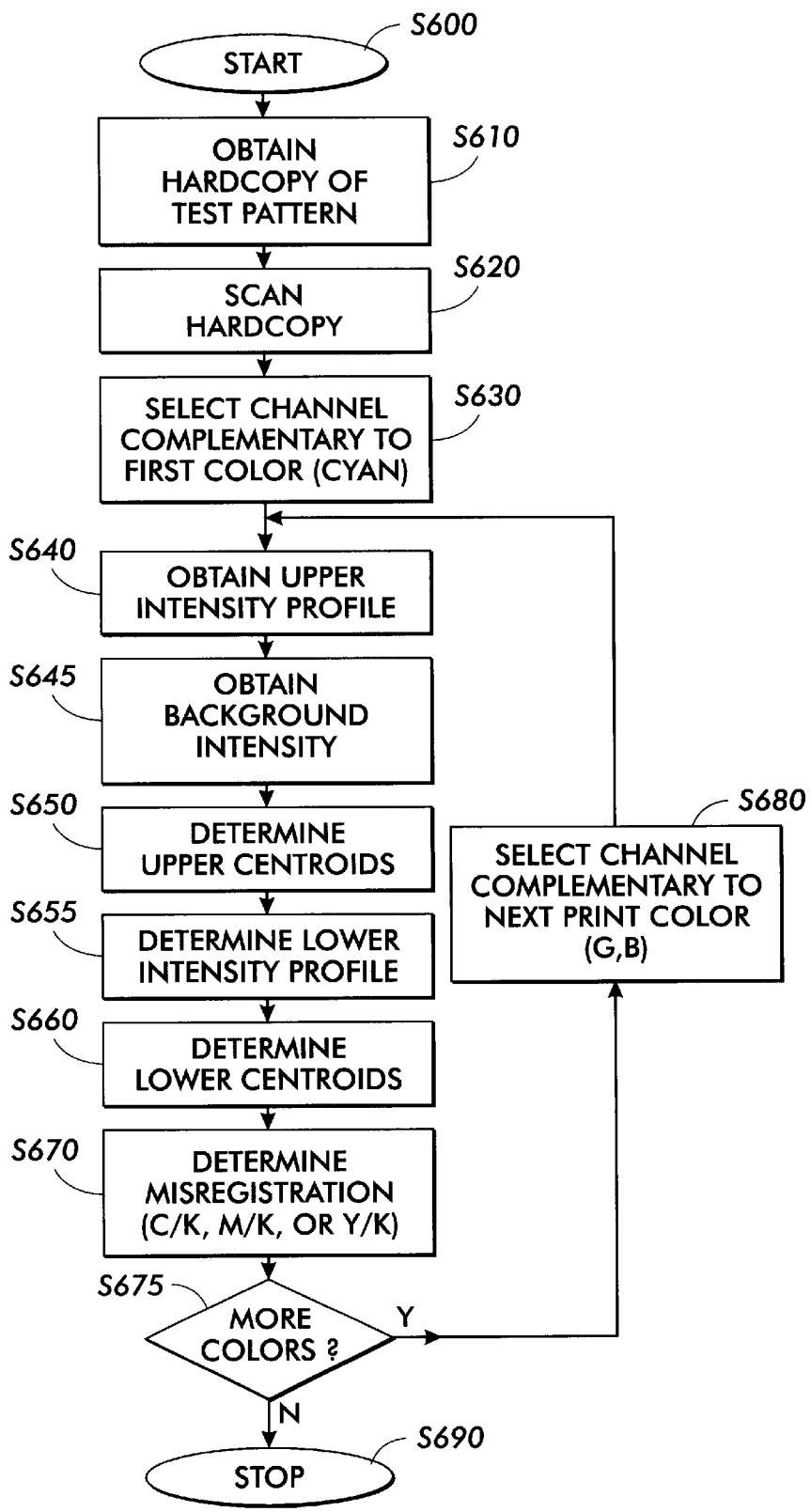
FIG. 6 is a flow chart showing an exemplary color-color registration analysis according to the invention.

Returning now to the flow chart of FIG. 6 and the completion of step S650, flow advances to step S655 where a lower red profile is calculated similar to that of the upper red profile in step S640. Then, at step S660, lower centroids of lines L1, L2, L3, L4, L9 and L10 are calculated similar to that of the upper centroids, only using the central region CR2. This results in determination of centroids XL1, XL2, XL3, XL4, XL9 and XL10.

From step S660, flow advances to step S670 where misregistration is calculated. In a first iteration, misregistration MC of Cyan (C) relative to Black (K) is calculated using the following equations:

$$UMC=0.5*((XU3+XU4)-(XL3+XL4));$$

$$SM=0.25*((XU1+XU2+XU9+XU10)-(XL1+XL2+XL9+XL10));$$

$$MC=UMC-SM,$$

where UMC is misregistration not corrected for skew and SM is the estimated contribution of skew to UMC.

After cyan misregistration MC is calculated, flow advances to step S675 where it is determined whether additional printed colors need to be tested. As magenta and yellow registrations have not yet been measured, the process advances to step S680 where the channel that provides the highest contrast for Magenta (Green) is selected and the process returns to step S640 for a second iteration of steps S640 to S670 using the green channel to ultimately determine misregistration of Magenta relative to Black using three equations similar to those above, but substituting use of the magenta lines U5, U6, L5 and L6 for the cyan lines U3, U4, L3 and L4. Then, at step S675 it is determined that the Yellow registration has not yet been measured and flow advances to step S680 where the channel that provides the highest contrast for Yellow (Blue) is selected and flow returns to step S6640 for a third and final iteration of steps S640 to S670 substituting use of the yellow lines U7, U8, L7 and L8 for the cyan lines U3, U4, L3 and L4. This time, as all three colors have been analyzed, the determination in step S675 is no and process advances to step S690 where the analysis is stopped.

The algorithm described above can be varied in several regards without changing its substantial features. For example, the test pattern (FIG. 4) could contain geometrical shapes other than lines from which centroids are determined; the number of lines of a given color could be changed; or the specific method to determine centroid location could be modified. Additionally, first and second sections could be horizontally aligned (rather than vertically aligned as in FIG. 4A) to determine lateral mis-registration. However, the key principles of the algorithm are: (1) a single channel of an image input device is used for measurement of a given color relative to another color; (2) the same algorithm as is used to measure the displacement of centroids of one color relative to another color, is applied to measure the displacement of two centroids for one and the same color, as caused by skew, and this result is further used to correct the color registration measurement for skew; (3) more than one line (or other geometrical shape) can be used to increase the accuracy of the measurement (in FIG. 4A two are used for C, M, and Y, and four are used for black); (4) the use of color lines in the digital test pattern at the exact same horizontal position as the (black) reference lines implies that the results will not be affected by quantization errors when the digital test pattern is rasterized; (5) the lines (or other geometrical shapes) are placed such that the measurements of relative displacements involve only very small distances, and therefore do not require high accuracy over larger distances.

Also, by using multiple channels of data (e.g., RGB data), the registrations of each of C, M, and Y relative to K are done independently using the channels R, G, and B, respectively. This means that the results are not affected by the registration of the R, G, B channels of the measurement device. This method would work equally well on any multiple color system, such as a copier with highlight color, where a channel is used that is complementary to the color being tested.

The technique has already been implemented in an image quality analysis system, tested with off-line scanners, and has demonstrated accuracy around 5 microns using standard 600 dpi CCD-based scanners.

Once this analysis is determined, a service call may be made using the communication module of FIG. 2 if any mis-registration is detected. Alternatively, information relating to color-color misregistration may be used by a corrective procedure within the image output device being tested to calibrate the device to correct for detected misregistration.

The present invention has been described with reference to specific embodiments, which are intended to be illustrative and non-limiting. Various modifications can be made to the invention without departing from the spirit and scope of the invention as defined by the appended claims.

What is claimed is:

1. A method of performing image quality analysis on a color image output device having an output station that generates a hardcopy color image output from an input image, the method comprising:

providing a test pattern having first and second sections of spaced geometrical marks, the first section of marks being black while the second section includes black marks and at least one color mark of a color other than black;

generating a hardcopy image output from the image output device using the test pattern as an input image;

scanning the hardcopy image to form a digital raster image using a scanner; and performing image quality analysis on the digital raster image, including determination of color-color misregistration with skew correction, wherein the step of performing image quality analysis includes:

taking reflectance profiles across both the first section and the second section using a channel of the scanner complementary to the color other than black;

calculating centroids of lines having the color and black;

measuring a first offset between a centroid of a color line and a centroid of a corresponding line from the first section having black marks to determine a total misregistration;

measuring a second offset between a centroid of a black mark from the second section and a centroid of a corresponding black mark from the first section having black marks to determine the contribution from skew to the previously calculated misregistration; and subtracting the second offset from the first offset to determine color misregistration compensated for skew of the color other than black relative to black.

2. The method of claim 1, wherein the geometric marks are parallel lines.

3. The method of claim 2, wherein the step of scanning uses an RGB scanner.

4. The method of claim 1, wherein the color is cyan.

5. The method of claim 4, wherein the step of performing image quality analysis further includes:

taking reflectance profiles across both the first section and the second section using a channel of the scanner complementary to magenta;

calculating centroids of marks having magenta and black;

measuring a first offset between a centroid of a magenta mark and a centroid of a corresponding mark from the one section having black marks to determine a total misregistration;

measuring a second offset between a centroid of a black mark from the second section and a centroid of a corresponding black mark from the first section having black marks to determine misregistration due to skew; and subtracting the second offset from the first offset to determine magenta to black misregistration compensated for skew.

6. The method of claim 4, wherein the step of performing image quality analysis further includes:

taking reflectance profiles across both the first section and the second section using a channel of the scanner complementary to yellow;

calculating centroids of marks having yellow and black;

measuring a first offset between a centroid of a yellow mark and a centroid of a corresponding mark from the first section having black marks to determine a total misregistration;

measuring a second offset between a centroid of a black mark from the second section and a centroid of a corresponding black mark from the first section having black marks to determine misregistration due to skew; and subtracting the second offset from the first offset to determine yellow to black misregistration compensated for skew.

7. The method of claim 1, wherein the geometric marks are parallel lines, the step of calculating centroids includes:

determining an approximate edge position for a line;

defining a line surround;

calculating a weight profile; and calculating a centroid of the line.

8. The method of claim 1, wherein the geometric marks are parallel lines and the test pattern includes 10 black lines L1 to L10 in the first section and 10 lines U1 to U10 in the second section, with U1 and U2 being black lines, U3 and U4 being cyan lines, U5 and U6 being magenta lines, U7 and U8 being yellow lines and U9 and U10 being black lines, the method comprising the steps of:

taking reflectance profiles across both the first section and the second section using a channel of the scanner complementary to cyan;

calculating centroids of lines U1, U2, U3, U4, U9 and U10 as XU1, XU2, XU3, XU4, XU9 and XU10, respectively;

calculating centroids of lines L1, L2, L3, L4, L9 and L10 as XL1, XL2, XL3, XL4, XL9 and XL10, respectively;

obtaining a measurement of misregistration UMC uncorrected for skew using the following equation, $$UMC = 0.5 \times ((XU3+XU4)-(XL3+XL4));$$

obtaining a measurement of skew SM using the following equation, $$SM = 0.25 \times ((XU1+XU2+XU9+XU10)-(XL1+XL2+XL9+XL10));$$

obtaining a measurement of cyan to black misregistration MC using the following equation, $$MC = UMC - SM.$$

9. The method of claim 1, wherein only a central region CR of the first and second sections are used for image quality analysis.

10. The method of claim 1, wherein the test pattern is stored in memory in the image output device.

11. The method of claim 10, wherein the image output device is a printer.

12. The method of claim 10, wherein the image output device is a copier.

13. An image quality analysis system for performing image quality analysis on a color image output device having an output station that generates a hardcopy color image output from an input image, the system comprising:

a test pattern having first and second sections of spaced geometrical marks, the first section of marks being black while the second section includes black marks and at least one color mark;

a scanner that forms a digital raster image from a hardcopy image output from an image output device to be tested that used the test pattern as an input image;

an image quality analysis module that performs image quality analysis on the digital raster image to determine color-color misregistration corrected for skew, wherein the geometric marks are lines, and the test pattern includes 10 black lines L1 to L10 in the first section and 10 lines U1 to U10 in the second section, with U1 and U2 being black lines, U3 and U4 being cyan lines, U5 and U6 being magenta lines, U7 and U8 being yellow lines and U9 and U10 being black lines.

14. The system of claim 13, wherein the geometric marks are parallel lines.

15. The system of claim 13, wherein the scanner is an RGB scanner.

16. The system of claim 15, wherein the image quality analysis module isolates misregistration for each color by conducting image quality analysis using signals from individual RGB channels of the RGB scanner.

17. The system of claim 13, wherein the scanner is integral with the image output device.

18. The system of claim 13, wherein the scanner is separate from the image output device.

* * * * *